US008342219B2

(12) United States Patent
Kosuge et al.

(10) Patent No.: US 8,342,219 B2
(45) Date of Patent: Jan. 1, 2013

(54) TAPE PLACEMENT APPARATUS AND TAPE PRINTER PROVIDED THEREWITH

(75) Inventors: Shinsaku Kosuge, Nagano-ken (JP); Kenichi Nakajima, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 14 days.

(21) Appl. No.: 13/179,999

(22) Filed: Jul. 11, 2011

(65) Prior Publication Data

US 2012/0012255 A1 Jan. 19, 2012

(30) Foreign Application Priority Data

Jul. 16, 2010 (JP) ................................ 2010-161441

(51) Int. Cl.

*B65C 9/18* (2006.01)
*B29C 65/50* (2006.01)
*B32B 37/00* (2006.01)
*B32B 38/14* (2006.01)
*B32B 43/00* (2006.01)

(52) U.S. Cl. ........................................ 156/387; 156/543

(58) Field of Classification Search .................. 156/384, 156/387, 538, 543
See application file for complete search history.

(56) References Cited

U.S. PATENT DOCUMENTS 5,318,239 A * 6/1994 Posso ......................... 242/608.8
5,839,837 A * 11/1998 Takehara ........................ 400/76
6,588,697 B2 * 7/2003 Kitayama .................. 242/608.6
7,097,372 B1 * 8/2006 Heyse et al. .................. 400/613
7,111,806 B2 * 9/2006 Craig ......................... 242/608.7

FOREIGN PATENT DOCUMENTS

JP 2008-194868 8/2008

* cited by examiner

*Primary Examiner* — Sing P Chan

(57) ABSTRACT

A tape placement apparatus in which a small roll of wound tape with an adhesive is placed in such a way that a tape can be unreeled freely from the small roll of tape, includes: a rotating table with which a tape end face of the small roll of tape makes contact after being positioned; and a table supporting section rotatably supporting the rotating table.

6 Claims, 4 Drawing Sheets

TAPE PLACEMENT APPARATUS AND TAPE PRINTER PROVIDED THEREWITH

The entire disclosure of Japanese Patent Application No. 2010-161441, filed on Jul. 16, 2010, is expressly incorporated by reference herein.

BACKGROUND

1. Technical Field

The present invention relates to a tape placement apparatus in which a small roll of wound tape with an adhesive is placed in such a way that a tape can be unreeled freely from the small roll of tape and to a tape printer provided with the tape placement apparatus.

2. Related Art

In the past, a tape cartridge in which a small roll of tape with an adhesive, the small roll of tape having axial end faces on which circular thin films are attached, is placed in such a way that a tape can be unreeled freely from the small roll of tape by rotatably supporting the small roll of tape in a cartridge case has been known (see JP-A-2008-194868).

In the small roll of tape with an adhesive which is produced by cutting a log roll, the adhesive sometimes sticks out and appears on the end faces in the width direction when the log roll is cut. Therefore, in the tape cartridge (the tape placement apparatus), films are attached on the end faces of the small roll of tape which is placed in the tape cartridge. As a result, even when the small roll of tape is rotated when a tape is unreeled therefrom, the small roll of tape does not come loose, and the small roll of tape can rotate smoothly in the cartridge case.

However, the problem is that the films become waste when the small roll of tape is used to the very end and lead to an increase in production cost of the small roll of tape itself. On the other hand, if the films on the end faces are not used, the adhesive which has stuck out and appeared on the end faces of the small roll of tape prevents the small roll of tape from rotating when the tape is being unreeled therefrom.

SUMMARY

An advantage of some aspects of the invention is to provide a tape placement apparatus that can rotate a small roll of tape smoothly and unreel a tape therefrom smoothly even when a film or the like is not attached to a small roll of wound tape with an adhesive and a tape printer provided with the tape placement apparatus.

An aspect of the invention is directed to a tape placement apparatus in which a small roll of wound tape with an adhesive is placed in such a way that a tape can be unreeled freely from the small roll of tape, including: a rotating table with which a tape end face of the small roll of tape makes contact after being positioned; and a table supporting section rotatably supporting the rotating table.

With this structure, the small roll of tape with an adhesive is placed on the rotating table and rotates with the rotating table. That is, even when the small roll of tape attaches to the rotating table with the adhesive on the end face of the small roll of tape, the rotating table rotates and the rotation of the small roll of tape is not prevented. This makes it possible to rotate the small roll of tape smoothly and unreel a tape therefrom smoothly without taking measures to prevent the end face of the small roll of tape from attaching to the rotating table, such as attaching a film on the end face of the small roll of tape.

In this case, it is preferable that the rotating table include a disk-shaped table main body and a positioning projection which is provided at the center of the table main body in a protruding manner and is placed through a shaft center of the small roll of tape.

With this structure, the positioning projection facilitates position adjustment of the rotation centers of the small roll of tape and the rotating table and makes it possible to rotate the small roll of tape and the rotating table on the same axis with reliability.

Moreover, in this case, it is preferable that the positioning projection be formed as a hollow circular projection formed in a protruding manner, and the table supporting section include a rotation guiding section which the positioning projection rotatably engages and an outer edge supporting section which movably supports an outer edge of the table main body.

With this structure, since the rotating table can place the small roll of tape thereon in a state in which the small roll of tape is positioned at the center thereof and the table main body is supported by the outer edge supporting section so as to be suspended in midair, it is possible to reduce the rotational resistance of the rotating table. This makes it possible to rotate the small roll of tape smoothly and stabilize the rotation of the small roll of tape.

Furthermore, in this case, it is preferable that the rotation guiding section have a guiding section main body and a circular cylinder section supporting the guiding section main body, in the positioning projection, a retaining hook section having elasticity and engaging the guiding section main body be provided so as to extend from the positioning projection, and the outer edge supporting section support the table main body in such a way that the retaining hook section does not make contact with the guiding section main body.

With this structure, since the rotating table engages the guiding section main body in a retained state by the retaining hook section and is supported by the outer edge supporting section, the guiding section main body and the retaining hook section do not make contact with each other. This prevents the rotating table from becoming detached from the table supporting section due to the posture of the tape placement apparatus and also makes it possible to rotate the rotating table smoothly. Furthermore, since the rotating table can be detached by releasing the engagement of the retaining hook section, it is possible to remove contamination by the adhesive etc. attached to the rotating table with ease.

Another aspect of the invention is directed to a tape printer which includes: the tape placement apparatus described above; a tape receiving section having inner faces, one of which is formed by the rotating table; and a printing section performing printing on a tape unreeled from the small roll of tape placed in the tape placement apparatus.

With this structure, since there is no possibility that the small roll of tape is prevented from rotating (a tape is prevented from being unreeled from the small roll of tape) by attachment of the end face of the small roll of tape to something with an adhesive, a tape is unreeled appropriately from the small roll of tape and appropriate printing can be performed on the tape.

In this case, it is preferable that a lid body which opens and closes the tape receiving section be further provided, and the table supporting section be provided in the lid body.

With this structure, in a used state, the small roll of tape makes contact with the rotating table in a positioning state, the rotating table rotatably supported by the table supporting section provided in the lid body. In this case, the adhesive attaches to the rotating table with which the small roll of tape makes contact, but forming the tape placement apparatus on the side of the lid body facilitates removal of the adhesive attached to the rotating table and other maintenance operations.

Moreover, in this case, it is preferable that, in the lid body, a small window be formed which allows the inside of the tape receiving section to be checked visually in a state in which the tape receiving section is covered with the lid body, and the rotating table be formed of a light-transmissive material.

With this structure, it is possible to check the inside of the tape receiving section visually and check the remaining amount or the type (color, pattern, etc.) of the small roll of tape without opening the lid body.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a tape printer provided with a tape placement apparatus according to the invention will be described with reference to the accompanying drawings. This tape printer performs printing while unreeling a tape from a small roll of tape placed in the tape printer and creates a label (a piece of tape) by cutting a printed portion of the small roll of tape (in this embodiment, the user cuts the printed portion).

Figure 1A:
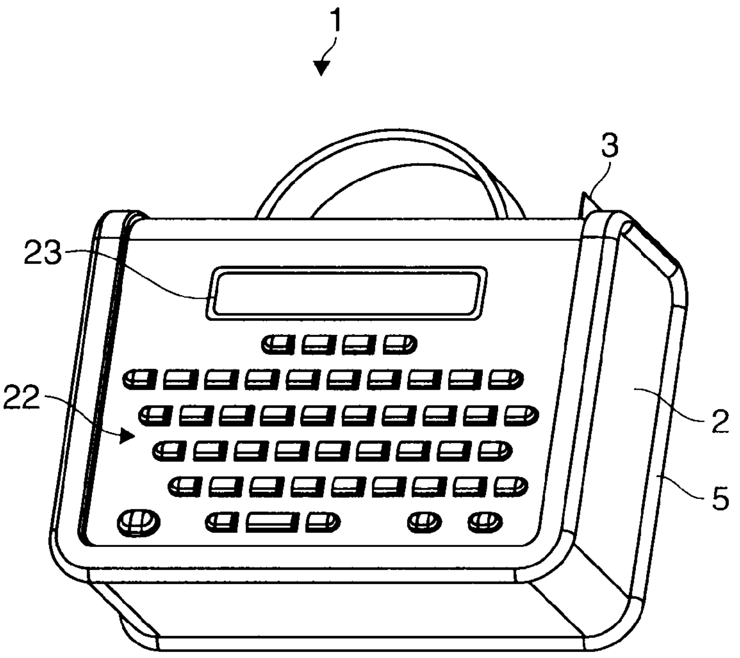
FIG. 1A a front external perspective views of a state in which a lid of a tape printer is closed, and FIG. 1B a back external perspective views of a state in which a lid of a tape printer is closed.
Figure 1B:
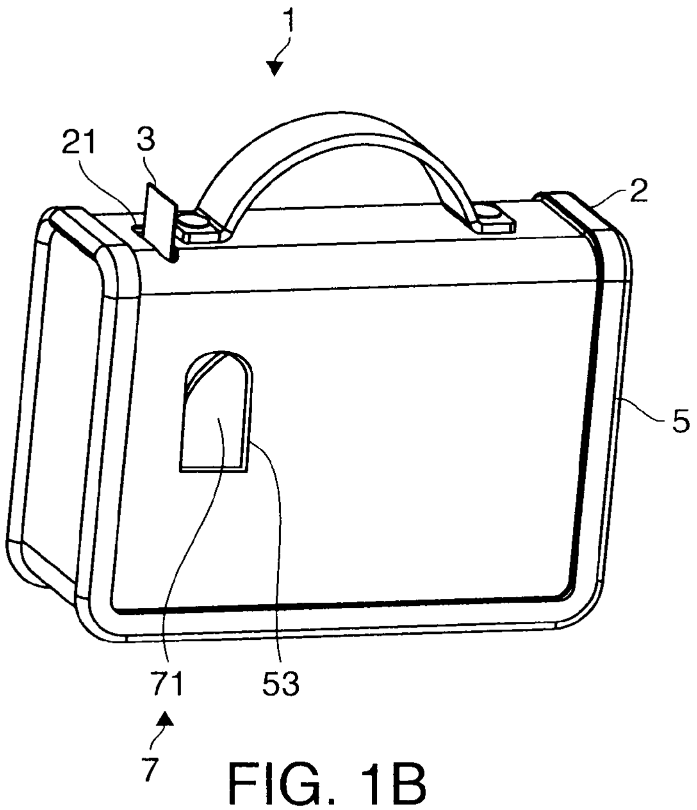
Figure 2:
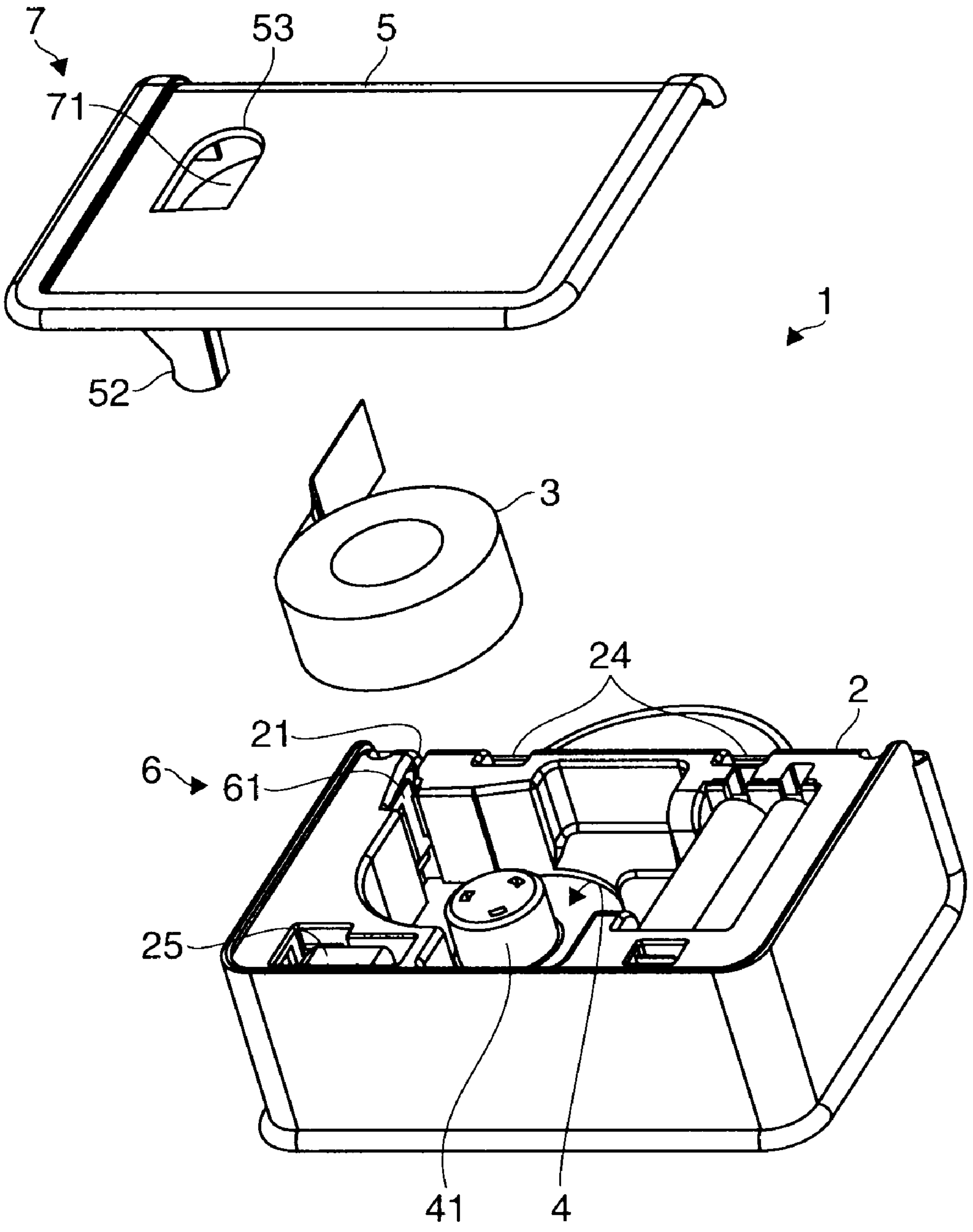
FIG. 2 is an external perspective view of the tape printer in a state in which an opening/closing lid is detached from an apparatus main body and a small roll of tape is removed therefrom.

With reference to FIGS. 1A, 1B, and 2, a tape printer 1 will be described. FIGS. 1A and 1B are front and back external perspective views in a state in which a lid of the tape printer 1 is closed. FIG. 2 is an external perspective view of the tape printer 1 in which a lid body 5 is detached from an apparatus main body 2 and a small roll of tape 3 is removed therefrom. The tape printer 1 includes the apparatus main body 2 forming the outer shell of the tape printer 1, a tape receiving section 4 which is formed as a concave portion in the apparatus main body 2, the tape receiving section 4 in which the small roll of tape 3 is detachably placed, the lid body 5 which is detachably provided for opening and closing the tape receiving section 4, a printing section 6 performing printing while unreeling a tape from the small roll of tape 3, and a tape placement apparatus 7 which is provided on a side of the lid body 5, the side facing the tape receiving section 4, the tape placement apparatus 7 in which the small roll of tape 3 is placed in such a way that a tape can be unreeled freely therefrom.

In the apparatus main body 2, a tape ejection port 21 from which an unreeled end of the printed tape of the small roll of tape 3 is ejected is formed. To be precise, a notch which forms part of the tape ejection port 21 is formed also in the lid body 5. Moreover, in an upper face of the apparatus main body 2, a keyboard 22 which is operated by the user and a display 23 displaying the operation results and the like are provided. Incidentally, the user performs normal printing operation with the face in which the keyboard 22 and the display 23 are provided facing upward.

The small roll of tape 3 has no core member at the shaft center thereof (is of the so-called centerless type), and is formed by winding only a long tape with an adhesive so that a hole of predetermined size is formed at the shaft center thereof. That is, the small roll of tape 3 is formed of a tape main body (an ornamental tape) with the back side to which an adhesive is applied and a release tape (release paper) pasted to the back side of the tape main body, which are tightly wound into roll shape.

The tape receiving section 4 has an engaging shaft 41 which engages the shaft center of the small roll of tape 3. The engaging shaft 41 is rotatably supported about an axis on the bottom face of the tape receiving section 4 and pivotally supports the small roll of tape 3 rotatably.

The lid body 5 closes the tape receiving section 4, and forms the bottom face of the tape printer 1 when the user operates the tape printer 1. The lid body 5 has two hinge sections 51 (see FIG. 3A) which are hooked through two hooking holes 24 formed in the apparatus main body 2, a hook section 52 which is locked by a locking mechanism 25 formed in the apparatus main body 2, and a small window 53 used for visually checking the inside of the tape receiving section 4 covered with the lid body 5. The lid body 5 moves about one side on which the two hinge sections 51 are provided, and is opened by pulling upward the side on which the hook section 52 is provided. Moreover, by unhooking the hinge sections 51 from the hooking holes 24 in a state in which the lid body 5 is opened, the lid body 5 can be detached from the apparatus main body 2. The small window 53 is formed of a light-transmissive material on the side of the lid body 5 where the tape ejection port 21 is formed, and makes it possible to check the small roll of tape 3 placed in the tape placement apparatus 7 from the outside when the tape receiving section 4 is covered with the lid body 5. Incidentally, the small window 53 may be formed in any position, size, and shape.

The printing section 6 has a platen roller (not shown) which unreels a tape from the small roll of tape 3 and transports the tape, a driving mechanism (not shown) which unreels the tape of the small roll of tape 3 and an ink ribbon (not shown) in synchronization, and a thermal head 61 which abuts the platen roller with the tape of the small roll of tape 3 and the ink ribbon placed between the thermal head 61 and the platen roller. In the part where the platen roller is located, the ink ribbon moves in a state in which the ink ribbon is placed on the tape unreeled from the small roll of tape 3 and printing processing is performed by the thermal head 61, and then the ink ribbon is sent to the apparatus main body 2 from the tape ejection port 21. In this case, the path over which the tape of the small roll of tape 3 is unreeled is cranked just before the thermal head 61 so that the tip of the small roll of tape 3 is not drawn inside through the tape ejection port 21 when no printing is performed. Then, the user cuts the printed portion in a tape width direction, whereby a piece of tape (a label) is created. Incidentally, a cutter mechanism etc. which automatically cuts the printed portion of the unreeled tape of the small roll of tape 3 may be provided.

Here, to place the small roll of tape 3 in the tape receiving section 4, the tape printer 1 is turned upside down so that the lid body 5 faces upward. Then, the lid body 5 is opened, and an unreeled end of the small roll of tape 3 is placed through the tape ejection port 21. The lid body 5 is then closed, and the keyboard 22 etc. is made to face upward.

Figure 3A:
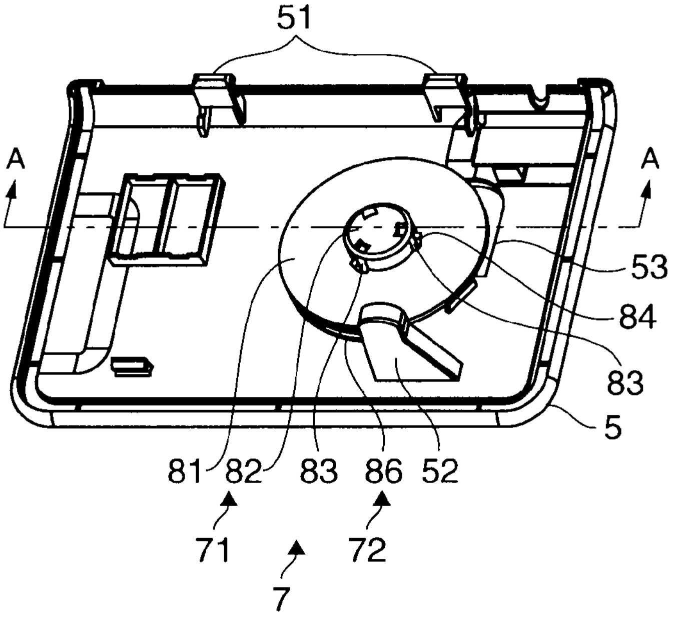
FIG. 3A is a perspective view of a lid body and a tape placement apparatus.
Figure 3B:
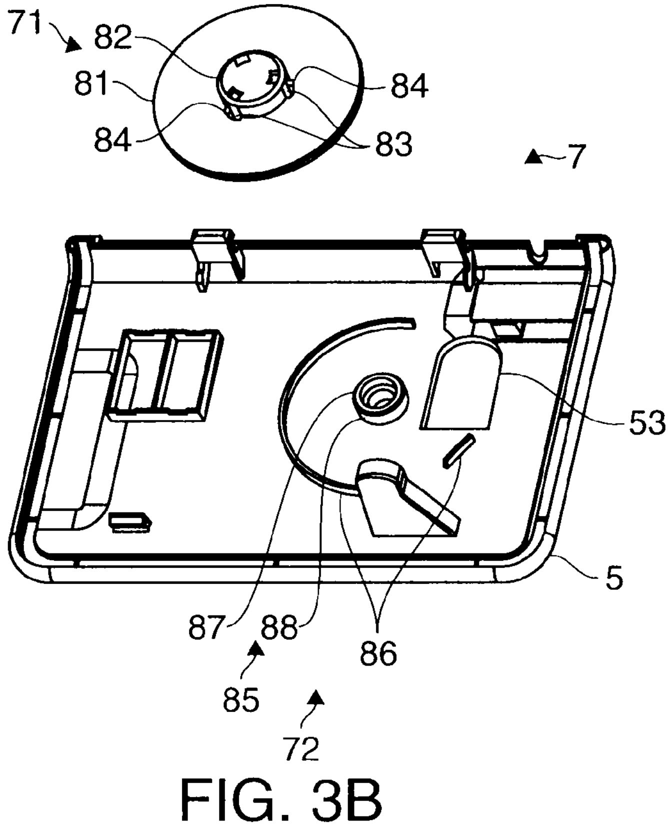
FIG. 3B is an exploded perspective view of the lid body and the tape placement apparatus.
Figure 4:
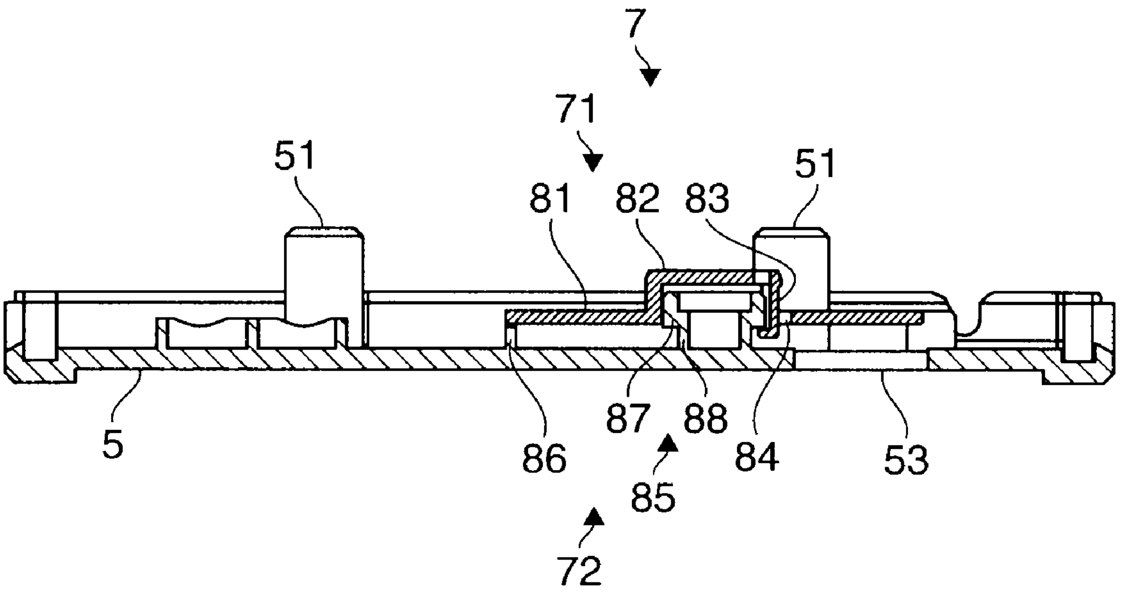
FIG. 4 is a sectional view of the lid body and the tape placement apparatus shown in FIG. 3A, the sectional view taken on the line A-A.

Next, with reference to FIGS. 3A, 3B and 4, the tape placement apparatus 7 will be described in detail. FIG. 3A is a perspective view of the lid body 5 and the tape placement apparatus 7, and FIG. 3B is an exploded perspective view of the lid body 5 and the tape placement apparatus 7. FIG. 4 is a sectional view of the lid body 5 and the tape placement apparatus 7 shown in FIG. 3A, the sectional view taken on the line A-A. The tape placement apparatus 7 includes, on the same axis as the small roll of tape 3, a rotating table 71 on which one end face of the small roll of tape 3 placed in the tape placement apparatus 7 abuts in a positioning state and a table supporting section 72 rotatably supporting the rotating table 71.

The rotating table 71 is formed of a disk-shaped table main body 81 and a positioning projection 82 which is provided at the center of the table main body 81 in a protruding manner and is placed through the shaft center of the small roll of tape 3, the table main body 81 and the positioning projection 82 integrated together. Incidentally, when the lid body 5 is attached to the apparatus main body 2, the rotating table 71 forms one of the inner faces of the tape receiving section 4.

The positioning projection 82 is formed as a hollow circular projection formed in a protruding manner, and, at the outer edge of the positioning projection 82, a plurality of (in this embodiment, three) retaining hook sections 83 having elasticity are provided at regular intervals through the table main body 81 so as to extend downward from the positioning projection 82. Each retaining hook section 83 engages a guiding section main body 87, which will be described later, thereby bringing the rotating table 71 and the table supporting section 72 in a retained state. Incidentally, in the table main body 81, a plurality of (in this embodiment, three) hook through holes 84 through which the retaining hook sections 83 are placed are formed.

The positioning projection 82 is formed in a position in which the positioning projection 82 and the engaging shaft 41 provided in the tape receiving section 4 are on the same axis in a state in which the tape receiving section 4 is covered with the lid body 5. As a result, when the small roll of tape 3 is placed in the tape receiving section 4 and then the lid body 5 is attached, the small roll of tape 3 is positioned by the engaging shaft 41 and the positioning projection 82. That is, the positioning projection 82 facilitates position adjustment of the rotation centers of the small roll of tape 3 and the rotating table 71 and makes it possible to rotate the small roll of tape 3 and the rotating table 71 on the same axis with reliability.

Moreover, the rotating table 71 is formed of a light-transmissive material. As a result, by looking into the tape receiving section 4 through the above-described small window 53, it is possible to check the small roll of tape 3 visually through the rotating table 71. This makes it possible to check the remaining amount or the type (color, pattern, etc.) of the small roll of tape 3 in the tape receiving section 4 without opening the lid body 5.

The table supporting section 72 has a rotation guiding section 85 which the positioning projection 82 rotatably engages and an outer edge supporting section 86 which movably supports the outer edge of the table main body 81.

The rotation guiding section 85 is formed of the guiding section main body 87 which the retaining hook sections 83 of the above-described positioning projection 82 engage and a circular cylinder section 88 supporting the guiding section main body 87, the guiding section main body 87 and the circular cylinder section 88 integrated together. The guiding section main body 87 is formed so as to have a diameter greater than that of the circular cylinder section 88 and is connected to the tip of the circular cylinder section 88 provided in the lid body 5 in a protruding manner. In addition, the tip of each retaining hook section 83 engages the step-like portion between the guiding section main body 87 and the circular cylinder section 88. This prevents the rotating table 71 from becoming detached from the table supporting section 72 due to the posture of the tape placement apparatus 7 and also makes it possible to rotate the rotating table 71 smoothly. Furthermore, by releasing the engagement of each retaining hook section 83 having elasticity, it is possible to remove contamination by the adhesive etc. of the small roll of tape 3 easily, the adhesive etc. attached to the rotating table 71, in a state in which the rotating table 71 is detached.

The outer edge supporting section 86 is provided in the lid body 5 in a protruding manner along the outer circumference of the rotating table 71 concentrically with the rotation guiding section 85. To be precise, the outer edge supporting section 86 is provided in a protruding manner in a semicircular portion obtained by removing, from a circular portion, a portion in which the small window 53 is formed and in a portion near the small window 53. The outer edge supporting section 86 is formed so as to have a height that prevents the retaining hook section 83 from making contact with the guiding section main body 87. As a result, since the table main body 81 is supported by the outer edge supporting section 86 so as to be suspended in midair, it is possible to reduce the rotational resistance of the rotating table 71. That is, it is possible to rotate the small roll of tape 3 smoothly and stabilize the rotation of the small roll of tape 3.

In the tape printer 1 described above, after the small roll of tape 3 is placed in the tape receiving section 4 and the lid body 5 is attached, when the keyboard 22 etc. of the tape printer 1 is made to face upward, the end face of the small roll of tape 3 comes into contact with the table main body 81, and the small roll of tape 3 and the rotating table 71 rotate on the same axis.

At this time, the adhesive which has stuck out and appeared on one end face of the small roll of tape 3 attaches to the table main body 81, but the adhesive does not prevent the rotation of the rotating table 71. That is, rotation of the rotating table 71 makes it possible to rotate the small roll of tape 3 smoothly and unreel a tape therefrom smoothly without taking measures to prevent the end face of the small roll of tape 3 from attaching to the table main body 81, such as attaching films on the end faces of the small roll of tape 3. Moreover, since there is no need to attach the films or the like on the end faces of the small roll of tape 3, it is possible to reduce the waste (the films) produced when the small roll of tape 3 is used to the very end and reduce the production cost of the small roll of tape 3 itself.

What is claimed is:

1. A tape printer for printing on tape that is unreeled freely from a small roll of tape with adhesive, comprising:

a rotating table with which a tape end face of the small roll of tape makes contact after being positioned;

a table supporting section with which the rotating table rotatably engages;

a tape receiving section having inner faces, one of which is formed by the rotating table;

a printing section performing printing on the tape unreeled from the small roll of tape; and a lid body which opens and closes the tape receiving section;

wherein table supporting section is provided in the lid body.

2. The tape printer according to claim 1, wherein the rotating table includes a disk-shaped table main body, and a positioning projection which is provided at the center of the table main body in a protruding manner and is placed through a shaft center of the small roll of tape.

3. The tape printer according to claim 2, wherein the positioning projection is formed as a hollow circular projection formed in a protruding manner, and the table supporting section includes a rotation guiding section which the positioning projection rotatably engages, and an outer edge supporting section with which an outer edge of the table main body movably engages.

4. The tape printer according to claim 3, wherein the rotation guiding section has a guiding section main body and a circular cylinder section supporting the guiding section main body, in the positioning projection, a retaining hook section having elasticity and engaging the guiding section main body is provided so as to extend from the positioning projection, and the outer edge supporting section supports the table main body in such a way that the retaining hook section does not make contact with the guiding section main body.

5. The tape printer according to claim 1, wherein in the lid body, a small window is formed which allows the inside of the tape receiving section to be checked visually in a state in which the tape receiving section is covered with the lid body, and the rotating table is formed of a light-transmissive material.

6. A tape placement apparatus in which a small roll of wound tape with adhesive is placed so that the tape can be unreeled freely from the small roll of tape, the tape placement apparatus comprising:

a rotating table with which a tape end face of the small roll of tape makes contact after being positioned;

a table supporting section with which the rotating table rotatably engages;

a tape receiving section having inner faces, one of which is formed by the rotating table; and a lid body which opens and closes the tape receiving section;

wherein the table supporting section is provided in the lid body.

* * * * *